June 21, 1927. 1,633,052
J. S. WATTS
REDUCING GEAR AND TRANSMISSION CONTROL
Filed Jan. 18, 1926  3 Sheets-Sheet 2

INVENTOR
John S. Watts
By
Ramsch A. Graham
ATTORNEY

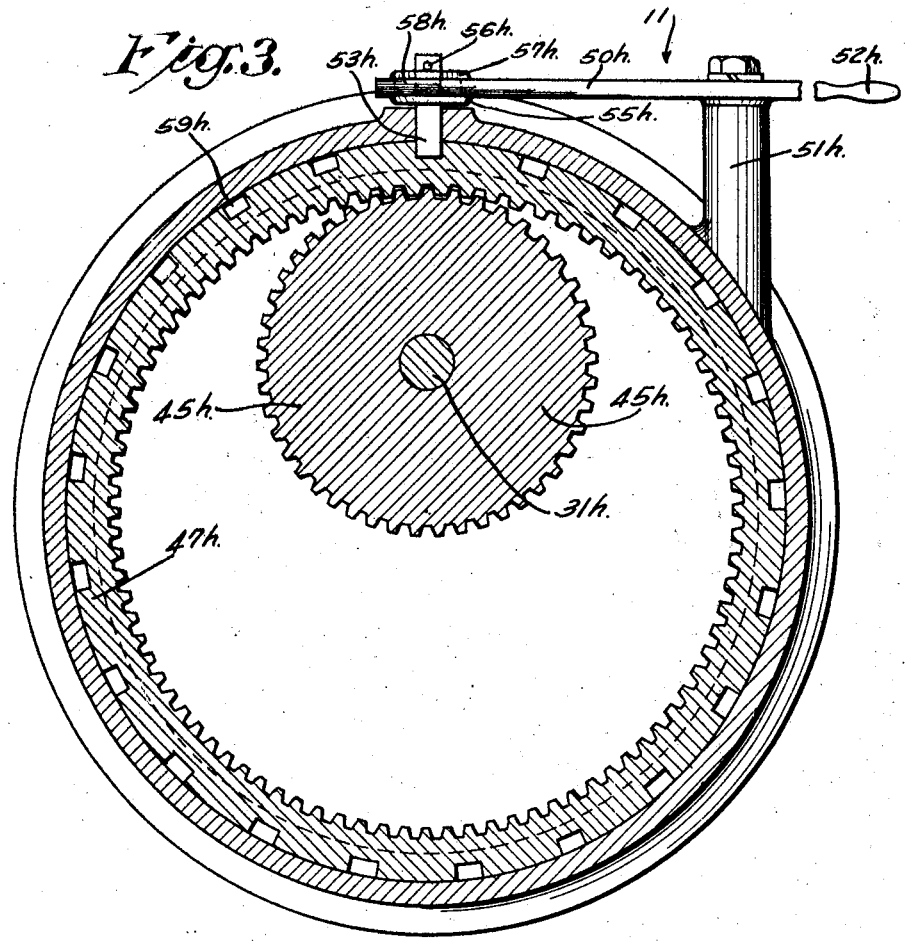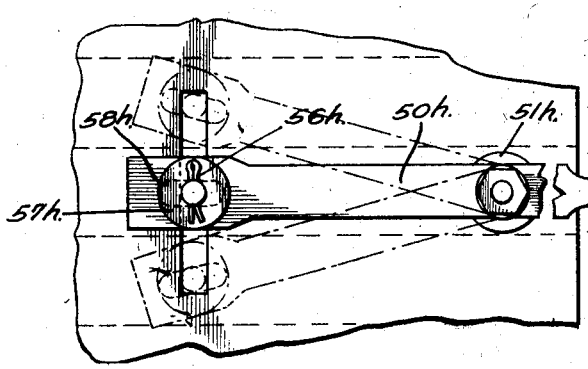

Patented June 21, 1927.

1,633,052

UNITED STATES PATENT OFFICE.

JOHN S. WATTS, OF LOS ANGELES, CALIFORNIA.

REDUCING GEAR AND TRANSMISSION CONTROL.

Application filed January 18, 1926. Serial No. 81,979.

This invention relates particularly to means for the transmission of power or motion; and it is an especial object of this invention to provide very compact and simple means for producing a comparatively high reducing (or multiplying) effect.

It is an object of this invention to provide reducing gear trains adapted to be interposed between a drive shaft and a driven shaft coaxial therewith, such reducing trains being adapted to be secured within practically cylindrical housings, exceptionally rugged, capable of easy and reliable lubrication, and so constructed as to facilitate access to moving parts, for purposes of repair or replacement.

It is a further object of my invention to provide, in reducing transmissions of the general character referred to, means equivalent not only to a gear shifting organization, suitable to effect variations in the relative speed of a driven shaft, but also means permitting an actual reversal in the direction of rotation of said driven shaft.

Other objects of my invention, including alternative means for producing the mentioned variations in speed or the mentioned reversing effect, may be best appreciated from the following description of alternative embodiments of my invention, taken in connection with the appended claim and the accompanying drawings, in which Fig. 1 may be referred to as a longitudinal section through an embodiment of my invention in which two different speeds may be obtained by the shifting of a clutch sleeve which is longitudinally movable upon a drive shaft and which carries at its inner end, a suitable pinion, this view being shown for introductory purposes of general description but not specifically claimed in the present application (being claimed in my copending application, Serial No. 102,937, filed April 19, 1926).

Fig. 3 is a cross sectional view, taken substantially as indicated by the line 10—10 of Fig. 2, but with parts omitted or broken away.

Fig. 4 is a detail view, taken substantially as indicated by the arrow 11 of Fig. 3.

Figure 1:
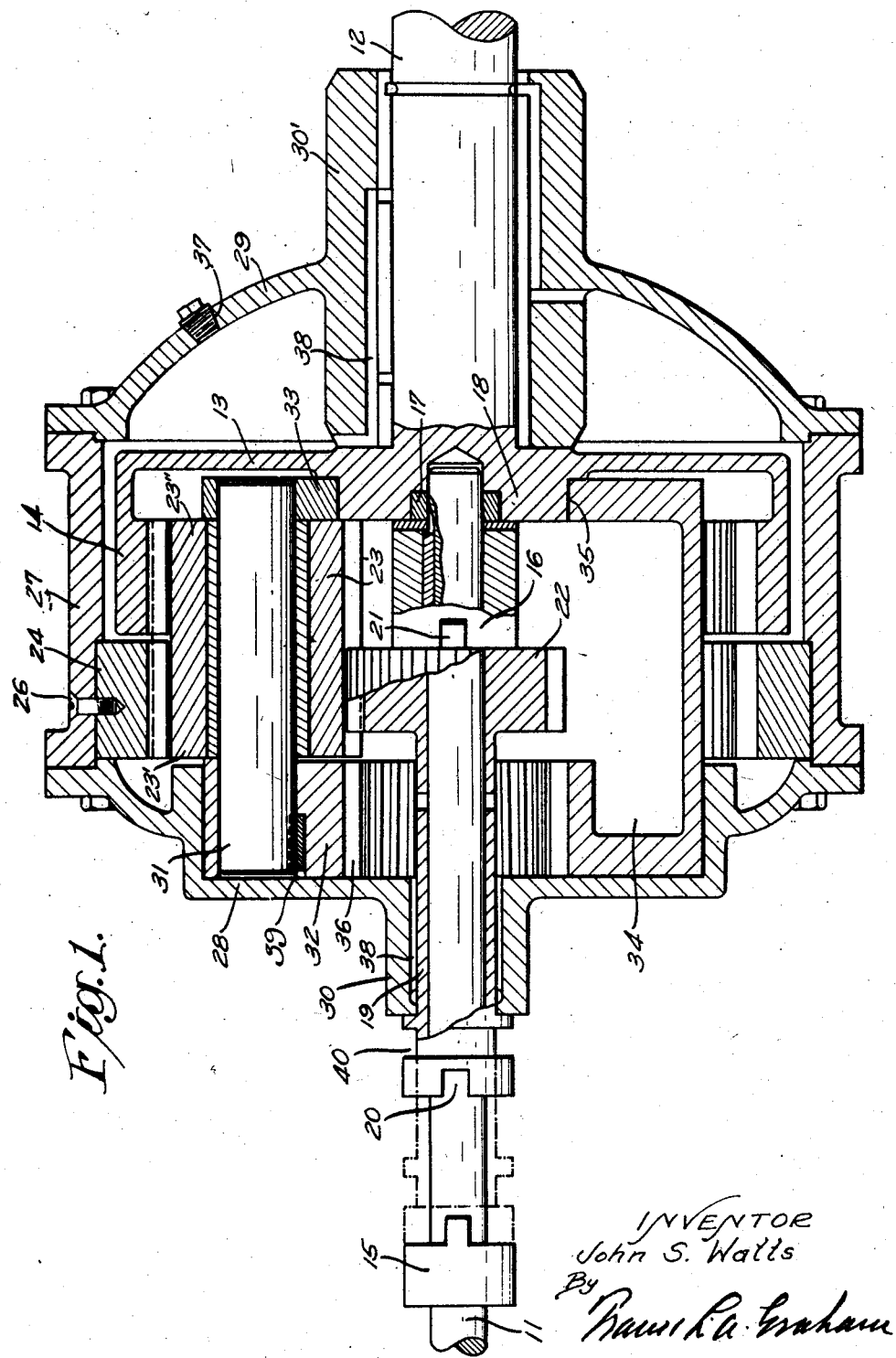
Figure 2:
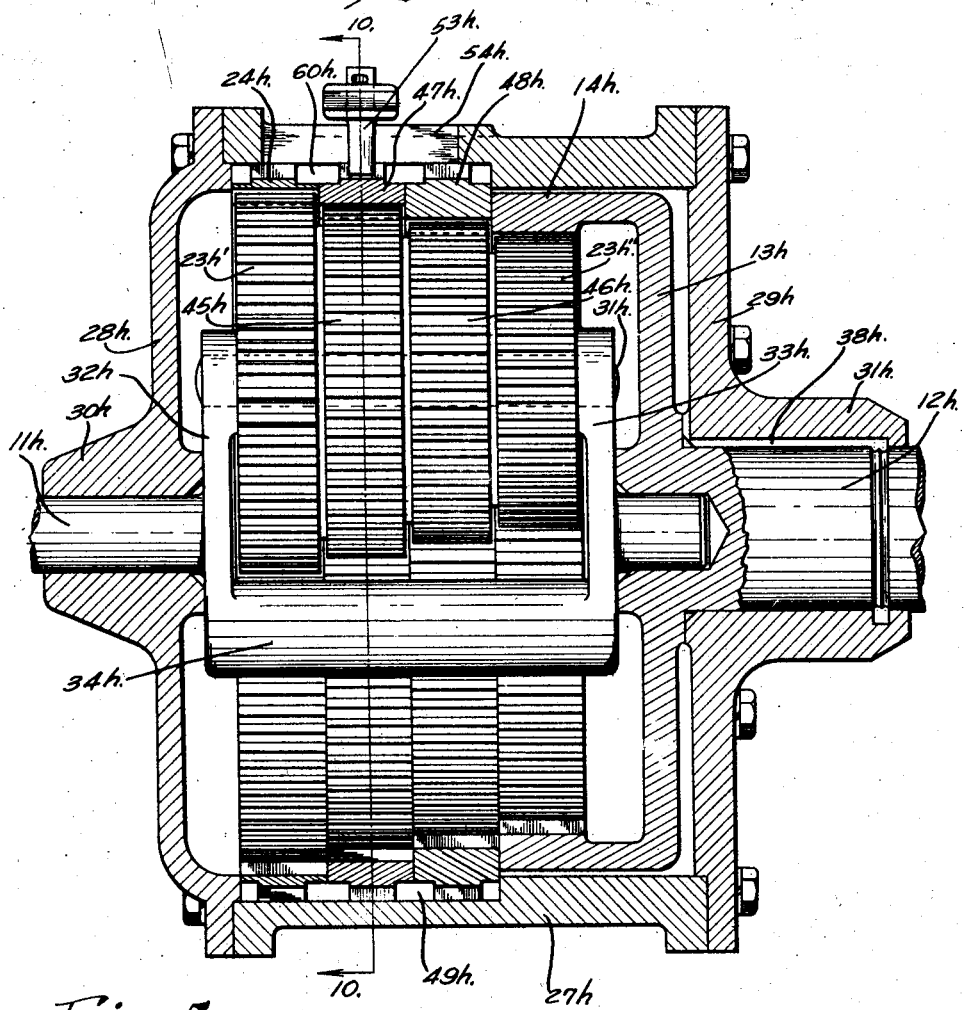
Fig. 2 is a view, taken similarly to Fig. 1 illustrating an embodiment of my invention in which provision is made for a speed-changing effect by merely holding stationary, at will, any one of a plurality of independently movable primary main gears, as hereinafter described.

Referring to the details of that specific embodiment of my invention illustrated in Fig. 1, 11 being referred to as a drive shaft, 12 is a driven shaft, shown as disposed coaxially therewith and integrally or otherwise rigidly connected, as by a disc 13, with a movable main gear 14. The shaft 11 is shown as carrying not only a pair of clutch elements 15 and 16, rigidly secured thereon and suitably spaced apart (the inner end of the shaft 11 being shown as provided at 17, with a bearing in a central boss 18 upon the mentioned plate 13) but also a sleeve 19, terminating in clutch faces 20 and 21 and carrying, at or near the inner end thereof, a small pinion 22.

In the position in which it is illustrated in Fig. 1, the pinion 22 engages a comparatively long interior gear 23, eccentrically disposed with reference to the mentioned parts hereinafter referred to as a travelling double gear, or as a composite gear, which is in constant mesh not only with the mentioned movable main gear 14 but with a fixed or primary main gear 24,—which may be secured (as by means of screws 26) within a substantially cylindrical element 27, comprised in a housing. This housing may include also end elements 28 and 29, shown as respectively provided with bearing extensions 30, and 30' for the mentioned shafts 11 and 12.

The interior composite gear 23 is shown as carried by a pin 31, extending through opposite end plates 32 and 33 of a substantially cylindrical internal block 34, the end plate 33 being shown as having, at 35, a bearing upon the mentioned boss 18, integral with the driven shaft 12. The opposite end plate 32 is provided with internal teeth 36 alternatively engageable by the pinion 22 on the sleeve 19, whenever the latter is so shifted as to effect a disengagement of the clutch face 21 from the constantly rotating clutch element 16, and an engagement between the clutch face 20 and the alternative clutch element 15. Lubrication may be effected in any suitable manner, as by the introduction of a preferred oil or grease through a plugged opening 37 and/or by internal ducts 38; and it will be recognized that whether the pin 31 is keyed, as at 39, to the block 34 or is permitted to rotate therein, and although the sleeve 19 may be shifted through an intermediate position in which no motion is transmitted through it, whenever said sleeve occupies that position in which it is shown in Fig. 1, assuming the primary main gear 24 to be held stationary and assuming, by way of example, that the travelling double gear 23 has the same diameter as the longitudinally movable pinion 22, each rotation of the pinion 22 will cause not only an opposite rotation but a corresponding travel of the double gear 23,—which may, in fact, be regarded as comprising separate gears or pinions 23' and 23'', engaging respectively the fixed or primary main gear 24 and the movable main gear 14. Thus, depending upon the diameters and tooth ratios, the pin 31 may be bodily advanced in a direction corresponding to the rotation of the pinion 22 and at a rate such as (in the embodiment illustrated) one rotation of the pin 31 to four revolutions of said pinion. Whenever, on the other hand, the pinion 22 is retracted (as by means of a fork, not shown, entering a groove 40, near the exposed end of the sleeve 19) into a direct interfitting engagement with "teeth" 36 integral with the block 32, it will be obvious that said block and with it the pin 31, must rotate in the same direction with, and at the same rate as the pinion 22,—that is at the same rate as the drive shaft 11.

Referring further to the embodiment of my invention illustrated in Fig. 1, it will be seen that a positioning of the pinion 22 in engagement with the teeth 36 may cause a speed reduction of (say) 25 to 1; whereas a shifting of the pinion 22 to the position in which it is illustrated may produce a speed reduction (say) four times as great, or to 100:1; but obviously I may provide my relatively movable main gears either with fewer teeth or with more teeth than my fixed main gears,—the latter arrangement being effective to cause, if the described shaft and means corresponding to pinion 22 of Fig. 1 are assumed to be revolved in the same directions as before, a slow rotation of the movable main gear in the same direction as said shaft and pinion. Thus, if the primary main gear 24 had 26 teeth, and the second or movable gear 14 had 25 teeth, although the speed reduction may still be in the ratio of 25 to 1, the direction of rotation of the driven shaft 12 would become opposite to that indicated above.

In Figs. 2, 3, 4 and 5, I show forms of my invention in which speed-changing and/or reversing effects are obtained in an especially simple and reliable manner. The ratio of reduction effected by organizations embodying my invention being obviously dependent upon, inter alia, the number of teeth in a fixed or primary main gear, as compared with the number of teeth in a secondary main movable gear connected with a driven shaft, I show, in the figures last referred to, an embodiment of my invention in which any one of a plurality of primary main gears, disposed in parallel and concentric relationship, may alternatively be held stationary, while additional like gears are permitted idly to rotate; and the ratio of speed reduction (or multiplication) and/or a reversing effect is, in this embodiment of my invention accordingly dependent upon the selection of a particular primary main gear to be held stationary.

The drive shaft $11^h$ is shown as rigidly connected with a block or cage $34^h$, a pin $31^h$ extending through end plates $32^h$ and $33^h$ of the block or cage $34^h$, being integral not only with terminal gears $23^{h\prime}$ and $23^{h\prime\prime}$ but with one or more intermediate gears $45^h$ and $46^h$. The driven shaft $12^h$ is rigidly connected, as by means of a disc or plate $13^h$, with a movable ring gear $14^h$, constantly engaged by the internal gear $23^{h\prime\prime}$; and the respective integrally united interior pinions or gears $23^{h\prime}$, $45^h$ and $46^h$ are shown as not only differing in teeth or diameter from gear $23^{h\prime\prime}$ and from one another but as constantly engaging respectively ring gears $24^h$, $47^h$, and $48^h$,—all three of these last mentioned ring gears being shown as of substantially the same external diameter and as freely rotatable within a cylindrical concavity $49^h$ in a central housing member $27^h$. This housing is shown as completed by end elements $28^h$ and $29^h$, respectively comprising bearing extensions $30^h$ and $31^h$,—to which lubricant may be delivered in any desired manner, as by means of channels or ducts $38^h$.

In order to hold any one of the rotatable primary main gear rings $28^h$, $47^h$ or $48^h$ stationary, I may employ means such as a lever $50^h$, shown as pivoted upon a rigid post $51^h$ and as provided at one end with a handle $52^h$ and at its opposite end with a finger, lug or pin, $53^h$, movable in a slot $54^h$, extending longitudinally of the unitary housing member $27^h$.

The finger or pin $53^h$, or an equivalent holding element, may be integral with an expansion 55ʰ, to provide a bearing surface against the lever 50ʰ; and it may be so retained (by means such as a cotter 56ʰ, or the like, shown as engaging a washer 57ʰ as to permit it to slide within a longitudinal slot 58ʰ in the lever 50ʰ; and the respective ring gears mentioned may be not only provided with a series of peripheral slots 59ʰ, adapted to be alternatively engaged by the pin 53ʰ, but so reduced (as by cutting the same away at 60ʰ) as to make sure that the pin 53ʰ, or its equivalent, shall never engage a plurality of said ring gears at the same instant.

Depending upon gear ratios, it will be obvious that I may so shift the described gears as to get widely different speed reductions,—such as, for example, a 50 to 1, or a 100 to 1, or a 200 to 1, reduction; and it will be appreciated that, although I show only three primary ring gears as alternatively engageable by the finger 53ʰ, any suitable greater or less number of primary main gears may be arranged either to be held by a single finger, or the like, or by one of a plurality of fingers alternatively or sequentially manipulable; and I especially emphasize the fact that the gear ratios employed may be such as to render the manipulation of the mentioned finger or fingers productive of a reversing effect.

Letting the letter "$a$" stand for the number of teeth in a primary main gear, such as those to which the characters 24 and 24ʰ have been above applied, "$b$" standing for the number of teeth in a small gear or pinion (such as 23′ or 23ʰ′) in mesh therewith, "$c$" standing for the number of teeth in a second main gear such as the rotatable gear 14, or 14ʰ, and letting "$d$" represent the number of teeth in any small pinion or gear (23″ etc.) rigidly connected with 23′, etc. the ratios in angular velocity or R. P. M. between shafts such as drive shaft 11 or 11ʰ and driven shaft 12 or 12ʰ may, in all forms of my invention, be found from the following general formula:

$$\text{Ratio} = 1 - \left(\frac{a}{b} \times \frac{d}{c}\right)$$

the implication of a minus sign, when occurring before the result, being merely that the mentioned shafts rotate in opposite directions.

Figure 5:
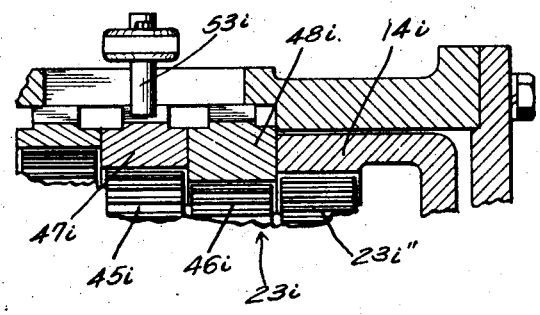
Fig. 5 is a fragmentary view of an embodiment comparable with that shown in Figs. 2–4, inclusive, as hereinafter described, but specialized for a reversing effect.

It will be appreciated that, for high reduction ratios, the above parenthetical quantity requires to be made to differ but little from unity,—as exemplified by the following:

$$1 - \left(\frac{201}{151} \times \frac{150}{200}\right) = 1 - \left(\frac{603}{604}\right) = +\frac{1}{604};$$

and it will also be obvious, that in point of fact, the principles of my invention are applicable not only to reducing gear (as by the indicated application of power to shaft 11, etc.) but to multiplying gear,—as by applying power to the shaft 12, etc. and utilizing the consequent rotation of shafts 11 etc. in the performance of work; but I draw especial attention to the fact that I may use two alternatively detainable ring gears to produce not only identical ratios of reduction (or multiplication) but opposite rotative effects upon a driven shaft,—and the two ring gears referred to need differ from one another only to the extent of two teeth, assuming the two ends or pinions comparable to 23′ and 23″ to be alike or to be provided with the same number of teeth. For example, assuming the longitudinal composite gear 23ⁱ of Fig. 5 to comprise a gear or pinion 23ⁱ″ having $x$ teeth and to be not in engagement with a movable ring gear 14ⁱ having 100 teeth but integral with gears or pinions 45ⁱ and 46ⁱ, having the same number of teeth as the pinion 23ⁱ″, if these gears or pinions 45ⁱ and 46ⁱ (being in constant mesh with ring gears 47ⁱ and 48ⁱ, which are alternatively engageable by the finger or other detaining member 53ⁱ) are respectively provided with 101 ($n+1$) teeth and with 99 (or $n-1$) teeth, the effects obtained will be as indicated by the following equations:

$$1 - \left(\frac{101}{x} \times \frac{x}{100}\right) = 1 - \frac{101}{101} = -\frac{1}{100}$$

$$1 - \left(\frac{99}{x} \times \frac{x}{100}\right) = 1 - \frac{99}{100} = +\frac{1}{100}$$

that is to say, although a 100 to 1 (or $n$ to 1) reduction is obtained in both cases, a reversing effect is obtained by shifting the pin or pinion 53ⁱ toward the right from the position in which it is shown in Fig. 5.

Although I have herein described several alternative embodiments of my invention, it will be understood not only that additional modifications thereof might easily be devised by those skilled in the art to which this case relates, but also that various features of my invention might be independently employed, without involving the slightest departure from the spirit and scope of my invention, as the same is indicated above and in the following claim.

I claim as my invention:

In a transmission of the general character described: a drive shaft; a shaft to be driven therefrom at a different angular velocity; a primary main gear provided with means for holding the same against free rotation; a second main gear secured to one of said shafts; a composite gear member disposed eccentrically of and engaging both of said main gears; means whereby rotation of said drive shaft causes said composite gear member to roll on said primary gear member and to impart to said driven shaft, through said second main gear, a velocity of rotation different from that of said drive shaft; said gears being confined within a housing having a slot and said main gear being provided with means for its detention by a finger which is movable transversely thereof throughout said slot.

In testimony whereof, I have hereunto set my hand at Los Angeles, California, this 4th day of January, 1925.

JOHN S. WATTS.